(12) United States Patent
Shimotsu et al.

(10) Patent No.: US 9,379,467 B2
(45) Date of Patent: *Jun. 28, 2016

(54) OPTICAL CONNECTOR HAVING A PRESS-FIT GUIDE PORTION

(75) Inventors: Akihiro Shimotsu, Ebina (JP); Masayuki Arai, Yokohama (JP)

(73) Assignee: Molex, LLC, Lisle, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/384,064

(22) PCT Filed: Jul. 13, 2010

(86) PCT No.: PCT/US2010/041778
§ 371 (c)(1),
(2), (4) Date: Jan. 13, 2012

(87) PCT Pub. No.: WO2011/008729
PCT Pub. Date: Jan. 20, 2011

(65) Prior Publication Data
US 2012/0114283 A1 May 10, 2012

(30) Foreign Application Priority Data
Jul. 13, 2009 (JP) .................... 2009-164641

(51) Int. Cl.
*G02B 6/36* (2006.01)
*G02B 6/38* (2006.01)
(Continued)

(52) U.S. Cl.
CPC .............. *H01R 12/88* (2013.01); *G02B 6/4292* (2013.01); *G02B 6/3817* (2013.01); *G02B 6/4214* (2013.01)

(58) Field of Classification Search
CPC .. G02B 6/4292; G02B 6/3817; G02B 6/3825; G02B 6/4246; G02B 6/3821; G02B 6/3849
USPC .................... 385/76–77, 92, 88–89
See application file for complete search history.

(56) References Cited

U.S. PATENT DOCUMENTS 4,149,026 A 4/1979 Fritz et al.
5,039,195 A 8/1991 Jenkins
(Continued)

FOREIGN PATENT DOCUMENTS

EP 0 932 224 B1 7/1999
EP 1 884 810 2/2008
(Continued)

OTHER PUBLICATIONS

International Search Report for PCT/US2010/041778.
(Continued)

*Primary Examiner* — Ryan Lepisto
*Assistant Examiner* — Mary El Shammaa
(74) *Attorney, Agent, or Firm* — Jeffrey K. Jacobs

(57) ABSTRACT

An optical connector is disclosed. The optical connector includes a cable having formed therein an optical waveguide, a plug having the cable connected thereto, and a connector housing configured to mount thereon the plug. The cable is provided with a cable-side guide portion. The plug is provided with a plug housing which has a plug-side guide portion and is attached to the cable. Either one of the cable-side guide portion and the plug-side guide portion is configured as a protrusive convex portion, and the other guide portion is configured as a concave portion so that the convex portion is press-fitted into the concave portion, thereby achieving a positioning of the cable and the plug housing.

18 Claims, 13 Drawing Sheets

(51) Int. Cl.
*H01R 12/88* (2011.01)
*G02B 6/42* (2006.01)

(56) References Cited

U.S. PATENT DOCUMENTS

| | | | |
|---|---|---|---|
| 5,356,308 A * | 10/1994 | Toba et al. | 439/495 |
| 5,745,622 A | 4/1998 | Birnbaum et al. | |
| 5,804,768 A | 9/1998 | Sexton | |
| 5,804,769 A | 9/1998 | Morena | |
| 5,951,322 A | 9/1999 | Nishikigi | |
| 6,107,577 A | 8/2000 | Sexton | |
| 6,116,791 A | 9/2000 | Laninga et al. | |
| 6,295,400 B1 | 9/2001 | Shahid | |
| 6,386,768 B1 | 5/2002 | Yoon et al. | |
| 6,438,301 B1 | 8/2002 | Johnson et al. | |
| 6,543,941 B1 | 4/2003 | Lampert | |
| 6,547,446 B2 | 4/2003 | Yamaguchi | |
| 6,623,173 B1 | 9/2003 | Grois et al. | |
| 6,764,255 B1 | 7/2004 | Dvoskin | |
| 6,893,165 B2 | 5/2005 | Ngo | |
| 7,038,191 B2 | 5/2006 | Kare et al. | |
| 7,066,746 B1 | 6/2006 | Togami et al. | |
| 7,226,217 B1 | 6/2007 | Benton | |
| 7,261,602 B2 | 8/2007 | Lloyd | |
| 7,312,520 B2 | 12/2007 | Furuyama et al. | |
| 7,435,145 B2 | 10/2008 | Nishio et al. | |
| 7,461,981 B2 | 12/2008 | Yow et al. | |
| 7,559,702 B2 | 7/2009 | Fujiwara | |
| 7,578,323 B2 | 8/2009 | Baehring et al. | |
| 7,581,892 B2 | 9/2009 | Daikuhara | |
| 7,653,280 B2 | 1/2010 | Fujii et al. | |
| 7,747,116 B2 | 6/2010 | Furuyama | |
| 7,751,660 B2 | 7/2010 | Ueno | |
| 8,449,202 B2 | 5/2013 | Shimotsu et al. | |
| 2004/0082211 A1 * | 4/2004 | Hsieh | 439/329 |
| 2005/0105860 A1 * | 5/2005 | Oono et al. | 385/88 |
| 2006/0093277 A1 | 5/2006 | Mulligan | |
| 2006/0274997 A1 * | 12/2006 | Furuno et al. | 385/89 |
| 2007/0122090 A1 | 5/2007 | Nishio et al. | |
| 2008/0013895 A1 | 1/2008 | Daikuhara | |
| 2008/0044140 A1 | 2/2008 | Wang et al. | |
| 2009/0208168 A1 * | 8/2009 | Ishikawa et al. | 385/14 |
| 2009/0239420 A1 * | 9/2009 | Nishio et al. | 439/656 |
| 2009/0257720 A1 * | 10/2009 | Ishikawa et al. | 385/88 |
| 2009/0297101 A1 | 12/2009 | Ono et al. | |
| 2012/0114283 A1 | 5/2012 | Shimotsu et al. | |

FOREIGN PATENT DOCUMENTS

| | | |
|---|---|---|
| JP | 59-157605 A | 9/1984 |
| JP | H11-84174 A | 3/1999 |
| JP | 2001-188920 | 1/2003 |
| JP | 2002-155037 | 5/2003 |
| JP | 2004-009412 | 7/2005 |
| JP | 2005-202228 A | 7/2005 |
| JP | 2005-103421 | 10/2006 |
| JP | 2005-104922 | 10/2006 |
| JP | 2006-284721 A | 10/2006 |
| JP | 2007-116451 A | 5/2007 |
| JP | 4730274 | 4/2008 |
| JP | 2009-086227 A | 4/2009 |
| JP | 2009-086256 A | 4/2009 |
| JP | 2009-086258 A | 4/2009 |
| WO | PCT/US2008/0011259 | 4/2009 |

OTHER PUBLICATIONS

U.S. Appl. No. 12/388,681, filed Aug. 20, 2008, Ishikawa.
U.S. Appl. No. 13/386,869, filed Feb. 3, 2011, Tamuro.
U.S. Appl. No. 13/384,059, filed Jul. 19, 2012, Shimotsu.
U.S. Appl. No. 13/383,277, filed Sep. 27, 2012, Shimotsu.

* cited by examiner

OPTICAL CONNECTOR HAVING A PRESS-FIT GUIDE PORTION

REFERENCE TO RELATED APPLICATIONS

The Present Application claims priority to prior-filed Japanese Patent Application No. 2009-164641, entitled "Optical Connector," and filed 13 Jul. 2009, the contents of which is fully incorporated in its entirety herein.

BACKGROUND OF THE PRESENT APPLICATION

The Present Application relates to an optical connector.

Hitherto, in an electronic device or apparatus such as a personal computer, a cellular phone, a PDA (personal digital assistant), a digital camera, a video camera, a music player, a game machine, or a car navigation device, in order to realize both a decrease in an overall size a casing thereof and an increase in the size of a display screen thereof, the casing is configured to be collapsible. In such a case, a flexible printed circuit (FPC) and conductive wires such as a fine coaxial cable are arranged so as to pass through an inside of a hinge portion that allows one casing to be pivotably connected with the other casing so that signals can be transmitted through parallel transmission.

Although a signal transmission speed is requested to increase in response to an increase in image resolution, since there is a limit in increasing the inside dimension of the hinge portion, it is practically impossible to arrange a conductive wire having a large width or diameter thereof. In addition, when a countermeasure against electro magnetic interference (EMI) is taken, the conductive wire will become larger in the width or diameter thereof.

In this regard, a method of optical transmission has been alternatively studied which is capable of transmitting a large amount of signals through serial transmission and is an excellent EMI countermeasure. An example is described in Japanese Patent Application No. 11-84174.

FIG. 13 is an perspective view of a conventional optical connector. As shown in the drawing figure of FIG. 13, an optical element portion, generally designated by reference numeral 870, is configured to receive therein an optical module including a light emitting element, a light receiving element and the like, and is coupled to a connector housing 811 by means of a coupling member 841. The connector housing 811 is provided with a groove-shaped guide portion 814 configured to allow a non-illustrated plug connected to a front end of a non-illustrated optical fiber to be inserted therein and an engagement wall portion 818 configured to be engaged with a front end of the plug. In addition, a pair of guide projections 831 is formed on a wall surface of the engagement wall portion 818, and the guide projections 831 are engaged with a pair of engagement holes formed in the plug, so that the plug is placed in position after insertion thereof.

The optical connector is provided with a clamping member 821 which is rotatably attached to the connector housing 811. A front end of the clamping member 821 is rotatably mounted on a rotation shaft 813 configured to project from a side surface of the engagement wall portion 818. The clamping member 821 is provided with elongated plate-like arm parts 822 configured to extend rearward from the front end of the clamping member 821. Moreover, latching portions 827 are connected to rear ends of the arm parts 822 so as to be engaged with the rear end of the plug, and an operation portion 825 allowing an operator to operate is connected to the rear ends of the latching portions 827.

When the plug is connected to the optical connector, the clamping member 821 is rotated from an attitude shown in the drawing figure of FIG. 13 to raise the operation portion 825, so that an upper surface of the guide portion 814 is open. Subsequently, the plug is inserted into the guide portion 814 from a rear side thereof, so that a front end surface of the plug comes into tight contact with the wall surface of engagement wall portion 818. In this case, the positioning of the plug is carried out by tightly fitting the guide projections 831 to be engaged with the engagement holes of the plug. Finally, when the clamping member 821 is rotated to lower the operation portion 825, the optical connector returns to assume the attitude shown in the drawing figure of FIG. 13. Owing to this configuration, the latching portions 827 are engaged with the rear end of the plug, and the plug is locked in a state of being connected to the optical connector.

However, according to the conventional optical connector, since the positioning of the plug is carried out by tightly fitting the guide projections 831 to be engaged with the engagement holes of the plug, it may be difficult for an operator to perform a connecting operation. Usually, when a plug connected to an optical fiber is connected to an optical connector, the guide projections 831 and the engagement holes are designed to have an extremely small dimensional tolerance since the positioning of a plug-side optical path relative to an optical connector-side optical path requires an extremely high degree of precision. For this reason, an operation of an operator moving the plug to cause the guide projections 831 to be inserted into the engagement holes requires a high degree of accuracy and is thus difficult to perform.

Furthermore, since various errors, such as, for example dimensional errors of the guide projections 831 per se, errors in attachment of the guide projections 831 to the engagement wall portion 818, and dimensional errors of the engagement holes of the plug are accumulated, it is difficult to secure highly precise adjustments between a plug-side optical path and a optical connector-side optical path.

Furthermore, as described above, since the positioning of the plug-side optical path and the optical connector-side optical path requires an extremely high degree of precision, not only the dimensional tolerance of the guide projections 831 and the engagement holes, but also all the dimensional tolerances of the respective members including the connection surface of the engagement wall portion 818 and the connection surface of the plug need to be set extremely low. Thus, it is necessary to perform the processing and assembly with high precision, and therefore the manufacturing time and the manufacturing cost must be increased.

SUMMARY OF THE PRESENT APPLICATION

Therefore, it is an object of the Present Application to obviate the above-described problems encountered by the conventional optical connector and to provide an optical connector having such a configuration that positioning of an optical waveguide and a plug housing is achieved when a guide portion of the optical waveguide and a guide portion of the plug housing are engaged, by press-fitting, with each other. As a result, it is not necessary to increase the dimensional precision of members other than the guide portion of the optical waveguide and the guide portion of the plug housing. Therefore, it is possible to achieve the positioning of the optical waveguide and the plug housing in an accurate and easy manner. Moreover, it is possible to suppress the influence of stress caused by the press-fit and prevent occurrence of an optical loss. Accordingly, the optical connector can be produced to have a small size and a simple structure at a low cost with high durability and good operability.

Therefore, an optical connector according to the Present Application includes a cable having formed therein an optical waveguide; a plug having the cable connected thereto; and a connector housing configured to mount thereon the plug, wherein: the cable is provided with a cable-side guide portion; the plug is provided with a plug housing which has a plug-side guide portion and is attached to the cable; and either one of the cable-side guide portion and the plug-side guide portion is configured as a protrusive convex portion, and the other guide portion is configured as a concave portion so that the convex portion is press-fitted into the concave portion, thereby achieving a positioning of the cable and the plug housing.

The optical connector according to another embodiment of the Present Application has such a configuration that the convex portion and the concave portion respectively are provided in plural number; at least two of the plural convex portions are convex portions configured to protrude laterally from a side surface of the cable or from a side surface of the plug housing; and at least two of the plural concave portions are concave portions configured to be depressed laterally from the side surface of the cable or from the side surface of the plug housing.

The optical connector according to a further embodiment of the Present Application has such a configuration that the convex portion includes circular arc-shaped side faces, and the concave portion includes circular arc-shaped side faces.

The optical connector according to a still further embodiment of the Present Application has such a configuration that a radius of the convex portion is smaller than a radius of the concave portion.

The optical connector according to a still further embodiment of the Present Application has such a configuration that the convex portion includes circular arc-shaped side faces, and the concave portion includes two oblique sides being inclined in mutually opposite directions to a central line of the concave portion.

The optical connector according to a still further embodiment of the Present Application has such a configuration that the cable is provided with an optical path conversion portion which is configured to be capable of reflecting light transmitted through the optical waveguide to be emitted to the outside of the cable and reflecting light incident from the outside of the cable to be introduced to the optical waveguide; and, two of the convex portions and two of the concave portions are positioned at the same positions as the optical path conversion portion in the axial direction of the plug.

The optical connector according to a still further embodiment of the Present Application has such a configuration that the connector housing is provided with a connector-side guide portion; the plug is provided with a relative connector guide portion configured to be engaged with the connector-side guide portion; and, the relative connector guide portion is positioned at the same position as the optical path conversion portion in the axial direction of the plug.

The optical connector according to a still further embodiment of the Present Application has such a configuration that the cable is a hybrid cable having laminated therein an optical waveguide and conductive wires; the plug is provided with a plug-side optical connection portion and a plug-side electrical connection portion; the connector housing is provided with an optical connection portion and an electrical connection portion; and, when the plug is mounted on the connector housing, the plug-side optical connection portion and the plug-side electrical connection portion oppose the optical connection portion and the electrical connection portion, respectively.

In accordance with the Present Application, the optical connector has a configuration in which the positioning of the optical waveguide and the plug housing is achieved when the guide portion of the optical waveguide and the guide portion of the plug housing are engaged, by press-fitting, with each other. Due to such a configuration, it is not necessary to increase the dimensional precision of members other than the guide portion of the optical waveguide and the guide portion of the plug housing. Moreover, it is possible to achieve the positioning of the optical waveguide and the plug housing in an accurate and easy manner. Furthermore, it is possible to suppress the influence of stress caused by the press-fit and prevent the occurrence of an optical loss. Accordingly, it is possible to provide an optical connector which can be produced to have a small size and a simple structure at a low cost with high durability and good operability.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which:

FIGS. 1A and 1B are views of an optical connector according to a first embodiment of the Present Application, illustrating a state where a lock member is left open and a cable is maintained at its position prior to being connected, in which FIG. 1A is a perspective view of a receptacle connector, and FIG. 1B is a perspective view of a plug connector;

FIGS. 6A to 6C are views illustrating an operation of tightly fitting the plug to be engaged with the receptacle connector according to the first embodiment of the Present Application, in which FIGS. 6A to 6C are perspective views illustrating a series of operations thereof.

DESCRIPTION OF THE PREFERRED EMBODIMENTS

While the Present Application may be susceptible to embodiment in different forms, there is shown in the Figures, and will be described herein in detail, specific embodiments, with the understanding that the disclosure is to be considered an exemplification of the principles of the Present Application, and is not intended to limit the Present Application to that as illustrated.

In the illustrated embodiments, directional representations—i.e., up, down, left, right, front, rear and the like, used for explaining the structure and movement of the various elements of the Present Application, are relative. These representations are appropriate when the elements are in the position shown in the Figures. If the description of the position of the elements changes, however, it is assumed that these representations are to be changed accordingly.

Figure 1B:
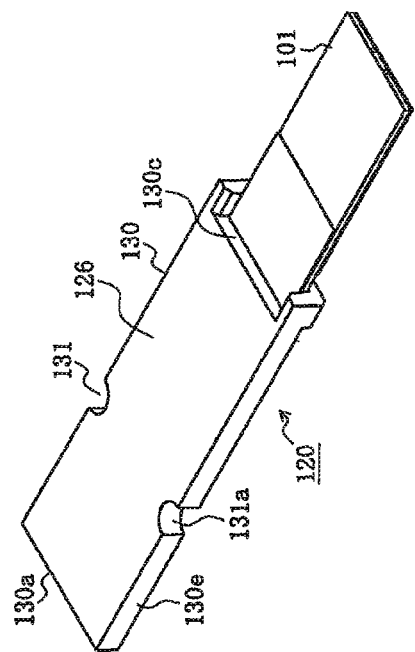
Figure 1A:
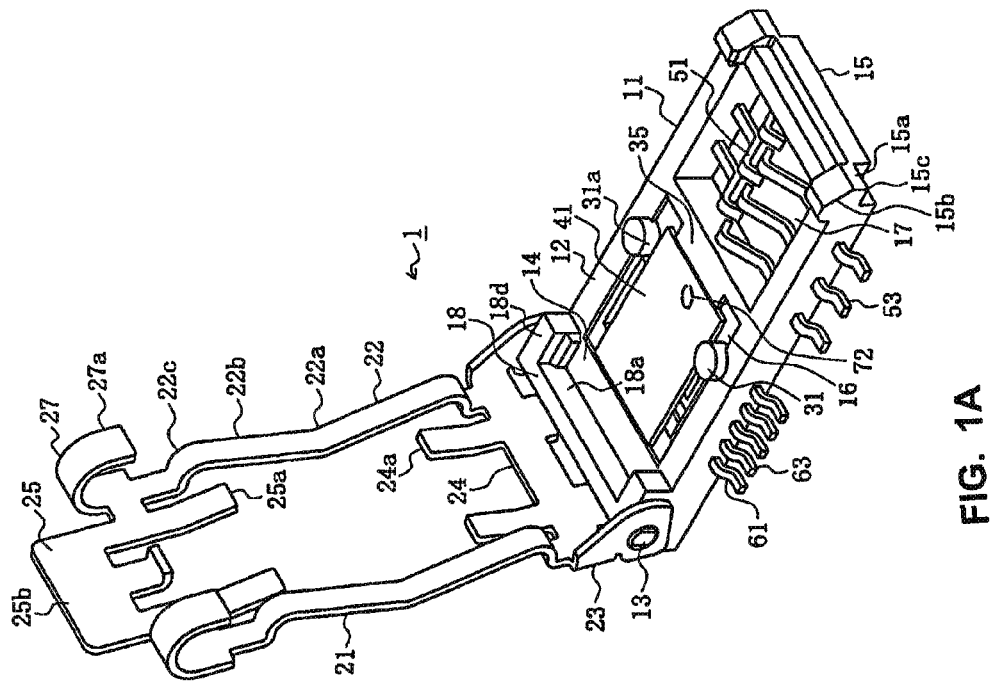

In FIGS. 1A and 1B, a receptacle connector as one of a pair of optical connectors according to the present embodiment, generally designated by reference numeral 1, is a board-side connector which is mounted on a surface of a non-illustrated board such as a circuit board and constitutes a part of an optical connector for establishing a connection to a cable 101.

In this specification, the cable 101 is a combined cable having integrated therewith an optical waveguide and later-described conductive wires 151. Specifically, the cable 101 is one in which a flexible flat plate-like cable such as a flexible printed circuit is laminated, by bonding, onto one surface of a strip-like optical waveguide to form an integrated body, or one in which a conductive pattern is formed on one surface of a strip-like optical waveguide.

In addition, a plug housing 130 is attached to an end portion of the cable 101, and a plug 120 as a plug connector which is a counterpart optical connector of an optical connector assembly is formed in the end portion. Moreover, the plug 120 is engaged, by fitting, with the receptacle connector 1, whereby the cable 101 is connected to the receptacle connector 1.

Moreover, the optical connector according to the Present Application functions as a connector for connecting thereto an optical waveguide. Therefore, it is to be noted that the optical connector does not need to be a combined cable having integrated therewith an optical waveguide and conductive wires 151 as long as it is capable of connecting cables having at least an optical waveguide. However, in the present embodiment, for the sake of explanation, the optical connector will be described as being comprised of a connector capable of connecting thereto a cable 101 which is a combined cable having integrated therewith an optical waveguide and the conductive wires 151.

Although the purpose of use of the cable 101 is not particularly limited, it is suitably used, for example, in a personal computer, a cellular phone, a PDA, a digital camera, a video camera, a music player, a game machine, or a car navigation device. Specifically, it is particularly useful in an electronic device or apparatus in which a casing is divided into a plurality of parts, and neighboring ones of the division parts are rotatably connected with each other, so that the cable is wired so as to pass through an inside of a hinge portion that rotatably connects the neighboring division parts. Moreover, the cable 101 is capable of transmitting signals through serial transmission via the optical waveguide, for example, and is an excellent EMI countermeasure, and is thus suitably used for high-speed transmission of a large amount of signals. Furthermore, the receptacle connector 1 is suitably used for being mounted on a surface of a board arranged within a casing of the electronic device or apparatus.

The receptacle connector 1 is provided with a connector housing 11 that is integrally formed of an insulating material such as synthetic resin and a lock member 21 as an elastic lock member, that is integrally formed of an elastically deformable material such metal or synthetic resin and is attached to the connector housing 11 in an attitude-changeable state. The lock member 21 may be formed by applying processing, e.g., bending and pressing, to a metal plate. Moreover, the lock member 21 is capable of changing its attitude by having a proximal end thereof (the lower end in FIG. 1A) being rotatably connected to a distal end (the upper left end in FIG. 1A) of the connector housing 11, so that it is rotated between an open position as a first position, as illustrated in FIG. 1A, for mounting the plug 120 onto the connector housing 11 and a closed position as a later-described second position for locking the plug 120.

The lock member 21 is an approximately rectangular, hollow plate-like member and includes a strip plate-like first crossbar portion 24 and a second crossbar portion 25 configured to extend in a short-axis direction (width direction) and a pair of elongated strip plate-like flexible portions 22, configured to extend in a long-axis direction (vertical direction) so that both ends of the first crossbar portion 24 and the second crossbar portion 25 are connected with each other. The flexible portions 22 function as an extendable/contractible portion.

The first crossbar portion 24 is disposed at a distal end of the lock member 21, and proximal ends of a pair of mounting leg parts 23 as an attachment portion are connected to both ends thereof in the short-axis direction. Each of the mounting leg part 23 extends in a direction approximately perpendicular to the first crossbar portion 24 so that a distal end thereof is rotatably connected to a distal end of the connector housing 11 via a rotation shaft 13 of the connector housing 11. In other words, the mounting leg parts 23 can be said to be connected to one ends of the flexible portions 22 via the first crossbar portion 24. Furthermore, proximal ends of first pressing portions 24a as a plug pressing portion configured to extend toward the second crossbar portion 25 are connected between portions of the first crossbar portion 24 connected to the pair of flexible portions 22. The first pressing portion 24a is a member that makes abutting contact with the upper surface of the plug top plate 126 of the plug housing 130 to press the plug 120 against the connector housing 11.

The second crossbar portion 25 is disposed at a rear end of the lock member 21, and proximal ends of a pair of latching arm parts 27 as a latched portion are connected to both ends on the rear end side in the long-axis direction. Each of the latching arm parts 27 has a generally U shape in side view and extends in a direction away from the first crossbar portion 24 to be downwardly bent so that a distal end portion 27a thereof is directed toward the first crossbar portion 24 to be engaged with or disengaged from the connector housing 11. In other words, the latching arm parts 27 can be said to be connected to one ends of the flexible portions 22 via the second crossbar portion 25. Moreover, at the closed position, the distal end portions 27a are latched to lock projections 15a as a latching portion of the connector housing 11. Furthermore, proximal ends of second pressing portions 25a as a plug pressing portion configured to extend toward the first crossbar portion 24 are connected between portions of the second crossbar portion 25 connected to the pair of flexible portions 22. The second pressing portion 25a is a member that makes abutting contact with the upper surface of the plug top plate 126 of the plug housing 130 to press the plug 120 against the connector housing 11.

In addition, a proximal end of a plate-like operation portion 25b extending in a direction away from the first crossbar portion 24 is connected to a portion of the second crossbar portion 25 disposed inner than the portions thereof connected to the latching arm parts 27. Although the operation portion 25b is a portion operated by an operator's fingers or the like when an attitude of the lock member 21 is to be changed, the operation portion 25b may be appropriately omitted if not necessary.

Moreover, each flexible portion 22 has a generally dog-leg shape in side view and is provided with a bent portion 22a that is bent so as to upwardly project at the closed position, flat plate-like or straight-line shaped straight portions 22b connected to both sides of the bent portion 22a, and connection portions 22c connecting both ends of the bent portion 22 to the first crossbar portion 24 and the second crossbar portion 25. Since the flexible portions 22 have such a lateral shape and are formed of an elastic material, they are capable of being elastically expanded or contracted. That is, since a distance between both ends of the flexible portion 22 can be increased, it is possible to increase a distance between the first crossbar portion 24 and the second crossbar portion 25. Specifically, when the bent portion 22a is downwardly pressed at the closed position, the degree of bending of the bent portion 22a is decreased and thus an angle between the straight portions 22b at both sides thereof is increased, and as a result, the distance between both ends of the flexible portion 22 is increased. That is, the flexible portion 22 is expanded or contracted in accordance with a change in the bending of the bent portion 22a.

The connector housing 11 is a plate-like member having a generally rectangular shape in top plan view and is provided with a pair of sidewall portions 12 extending in the long-axis direction and a rear-end wall portion 15 extending in the width direction at a rear end thereof so as to connect the sidewall portions 12 at both sides thereof. The connector housing 11 is further provided with a guide portion 14, an optical connection portion 16, and an electric connection portion 17 being arranged in tandem in the long-axis direction from a distal end thereof toward the rear end. The rotation shaft 13 is attached in the vicinity of a distal end of the sidewall portions 12, and the mounting leg parts 23 of the lock member 21 are rotatably attached to the rotation shaft 13.

The opposite sidewall portions 12 are connected with each other, at the distal end thereof, by the guide portion 14 while they are connected with each other, at a middle thereof, by a partition wall portion 35 extending in the width direction so as to partition the optical connection portion 16 and the electric connection portion 17.

Moreover, in the vicinity of both ends in the width direction of the rear-end wall portion 15, that is, in rear end surfaces of the opposite sidewall portions 12, lock projections 15a as a latching portion projected rearward are formed. When the lock member 21 is position at the closed position, the distal end portions 27a of the latching arm parts 27 are engaged with the lock projections 15a so that the lock member 21 is latched to the connector housing 11. As a result, the plug 120 is locked. Moreover, since the upper surfaces of the lock projections 15a are configured as tapered surfaces 15b that are downwardly sloped toward a rear side so that the distal end portions 27a can be easily slid on the upper surfaces. Furthermore, concave portions on the lower surface sides of the lock projections 15a are configured as concave latching portions 15c so that the distal end portions 27a can be firmly latched.

The lock projections 15a may be formed on side surfaces of the opposite sidewall portions 12.

The guide portion 14 is provided with a flat upper surface as a guide surface and an abutting portion 18 as a positioning portion configured to upwardly project from the upper surface. The abutting portion 18 is a wall-like portion which is integrally formed at a front end of the guide portion 14 so as to extend in the width direction, and is configured to be engaged with a front end portion 130a as a front portion of the plug housing 130. A rear end portion 18a as a positioning end of the abutting portion 18 opposes a front end portion of the plug 120, that is, the front end portion 130a of the plug housing 130. The abutting portion 18 is formed with guiding sidewall portions 18d as sidewall portions extending toward the rear side, which are formed at both ends in the width direction thereof. The inner walls of the guiding sidewall portions 18d function as guiding sidewalls and guide the plug 120. The guiding sidewall portions 18d are formed to be integral with the sidewall portions 12, and the rotation shaft 13 is specifically attached to the guiding sidewall portions 18d.

Moreover, on the left and right side wall portions 12, convex guide portions 31 as convex portions configured to protrude upwardly from the upper surfaces thereof are formed to be integral therewith. The convex guide portions 31 are circular column shaped members and are configured as connector-side guide portions which are engaged with concave guide portions 131 of the plug housing 130, thereby functioning as positioning guide portions for achieving a positioning of the plug 120 relative to the receptacle connector 1. For this purpose, at least a portion of each of the side walls 31a of the convex guide portions 31, opposing the center in the width direction of the connector housing 11 and corresponding to the innermost portion of the closed groove has a circular columnar side face shape which corresponds to a circular arc shape of the side walls 131a of the concave guide portions 131. In the example illustrated in the drawing figures, the convex guide portions 31 have a circular shape from a top plan view thereof.

The top view shape of the convex guide portions 31 is not necessarily the circular shape, but may be any shape as long as they have such a shape as to be engaged with the side walls 131a of the concave guide portions 131. For example, the convex guide portions 31 may be members having a semi-circular top view shape or may be members having a triangular shape or generally a V shape including two oblique sides, from a top plan view thereof.

On the other hand, on both the left and right sides of the plug housing 130 of the plug 120, the concave guide portions 131 used as relative connector guide portions are formed which are configured to be engaged with the convex guide portions 31, thereby functioning as a positioning guide portion for achieving a positioning of the plug 120 relative to the receptacle connector 1. The concave guide portions 131 are semi-circular concave portions which extend from the side faces of the left and right side face portions 130e toward the center in the width direction of the plug housing 130, and are open to the side faces of the side face portions 130e and closed to the center in the width direction of the plug housing 130. For this purpose, the side walls 131a of the concave guide portions 131 have a cylindrical inner side face shape which corresponds to the shape of the side walls 31a of the convex guide portions 31. That is to say, the concave guide portions 131 have a semi-circular shape from a side view thereof.

The top view shape of the concave guide portions 131 is not necessarily the semi-circular shape, but may be any shape as long as it has such a shape as to lie over and be engaged with the convex guide portions 31 to achieve positioning of the plug 120 relative to the receptacle connector 1. For example, the top view shape may be a trapezoidal or triangular shape.

When the concave guide portions 131 of the plug housing 130 are engaged with the convex guide portions 31 of the connector housing 11, the plug 120 mounted on the connector housing 11 can be guided to a predetermined position with high precision. Hence, the positioning of the plug 120 relative to the receptacle connector 1 can be achieved with high precision.

Moreover, at this time, the parts neighboring the front end portion 130a in side face portions 130e of the plug housing 130 are guided to guiding inner sidewalls of the guiding sidewall portions 18d, whereby the rough positioning in the width direction of the connector housing 11 and the plug 120 can be carried out in an easy manner. That is, by moving the front end portion 130a of the plug housing 130 and the neighboring portions thereof to be positioned between the guiding sidewall portions 18d on both sides thereof, the brief positioning between the connector housing 11 and the plug 120 can be achieved. In this way, the positioning between the connector housing 11 and the plug 120 can be carried out in an easy manner with high precision by the engagement between the convex guide portions 31 and the concave guide portions 131.

Furthermore, the plug 120 is a thin plate-like member having an approximately rectangular shape in top plan view, and when the plug 120 is mounted on the connector housing 11, a lower surface thereof opposes an upper surface of the connector housing 11.

In addition, the optical connection portion 16 is a portion that performs transferring of light to the optical waveguide of the cable 101 and is configured as a concave portion capable of receiving therein an optical device such as a control IC or the like as a light receiving/emitting control device (not shown) which is provided with an optical semiconductor device 72, e.g., a light receiving element and a light emitting element, and a control circuit for controlling the optical semiconductor device 72. In the example illustrated in the drawing figures, an upper surface of the concave portion is sealed by a thin plate-like sealing plate 41 which is formed of a translucent material such as glass.

Moreover, the optical connection portion 16 receives therein optical terminals 61 which are formed of a conductive material such as metal and connected to the optical semiconductor device 72 or the control IC. The optical terminals 61 are provided with tail portions 63 as board connection portions, which are connected, by soldering or the like, to connection pads formed on a surface of a board, and the tail portions 63 are projected outward from the lateral surfaces of the connector housing 11.

Furthermore, the electric connection portion 17 is a portion which is electrically connected to the conductive wires 151 of the cable 101, and is configured as a concave portion which is capable of receiving therein electric connection terminals 51 formed of a conductive material such as metal. The electric connection terminals 51 are provided with contact portions that are formed in the vicinity of free ends thereof and are curved so as to be convex toward the upper side and tail portions 53 as a board connection portion connected, by soldering or the like, to connection pads formed on a surface of a board, so that the tail portions 53 are projected outward from the lateral surfaces of the connector housing 11.

Figure 2:
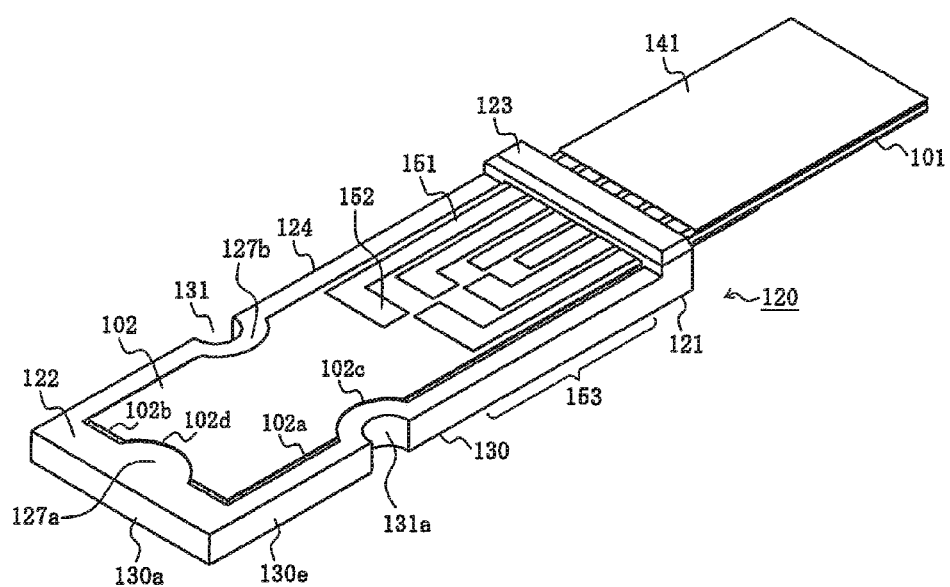
FIG. 2 is a perspective view of a plug according to the first embodiment of the Present Application.
Figure 3:
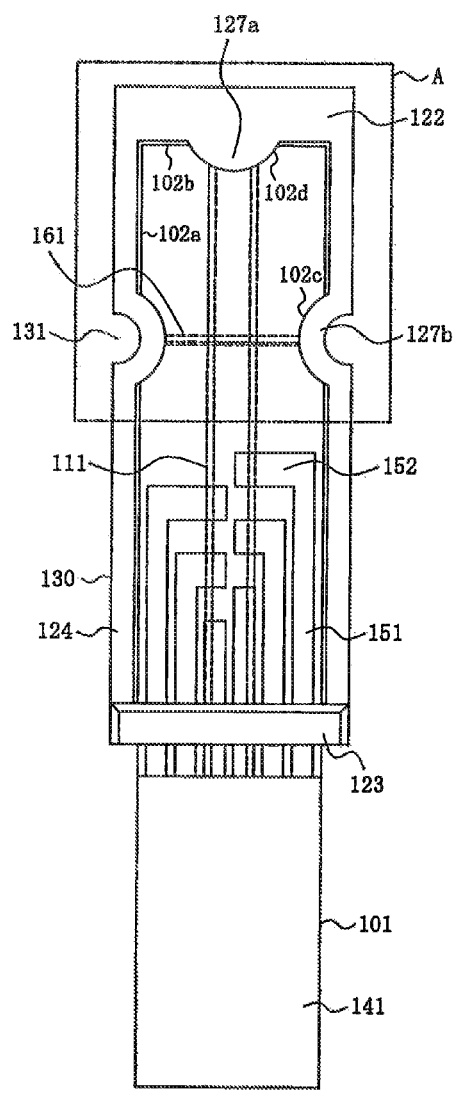
FIG. 3 is a bottom plan view of the plug according to the first embodiment of the Present Application.
Figure 4:
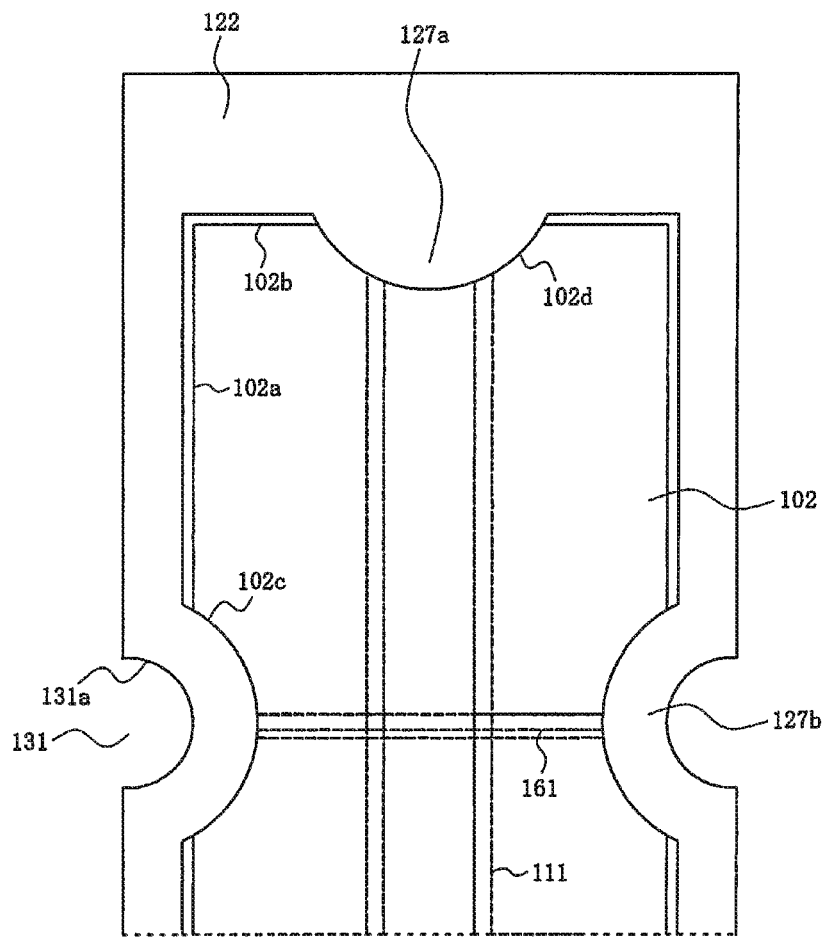
FIG. 4 is an enlarged view of a main portion ("A" portion in FIG. 3) of the plug according to the first embodiment of the Present Application.

Next, a detailed description of the structure of the plug 120 will be provided below. FIG. 2 is a perspective view of a plug according to the first embodiment of the Present Application;

FIG. 3 is a bottom plan view of the plug according to the first embodiment of the Present Application; and FIG. 4 is an enlarged view of a main portion ("A" portion in FIG. 3) of the plug according to the first embodiment of the Present Application.

Although the cable 101 is a thin plate member having an elongated strip shape, only a portion in the vicinity of a front end thereof (the lower left end in FIG. 2) is illustrated in FIGS. 2 and 3. Moreover, a connection end portion as a plug connection portion, designated by reference numeral 102, is formed within a range of a predetermined length from a front end surface 102b thereof.

On the lower surface of the cable 101, a plurality of lines, e.g., six lines of foil-like conductive wires 151 formed of a conductive material such as metal is arranged in parallel with one another at a predetermined pitch on a first insulating layer 141 of the cable 101. Furthermore, the first insulating layer 141 is removed in the connection end portion 102 so that the lower surface of the conductive wires 151 is exposed.

In addition, connection pad portions 152 having a large width are formed at distal ends of the respective conductive wires 151. The respective connection pad portions 152 are formed at positions corresponding to the contact portions of the electric connection terminals 51 received in the electric connection portion 17 of the connector housing 11 in a state where the cable 101 is connected to the receptacle connector 1. Moreover, a portion within the range, where the connection pad portions 152 are arranged, functions as a plug-side electric connection portion 153. Although the connection pad portions 152 may be arranged in an arbitrary form, it is preferable that they are arranged in a zigzag form, and arranged in tandem in an axial direction of the cable 101, as illustrated in the drawing figures. Owing to this configuration, it is possible to arrange a number of connection pad portions 152 without needing to increase the width of the connection end portion 102, and as a result, it is possible to suppress any increase in the width dimension of the plug 120. When the conductive wires 151 have a sufficiently large width, it is not necessary to form large-width connection pad portions 152, but it is possible to allow distal ends of the conductive wires 151 to function per se as the connection pad portions 152.

Moreover, at a portion of the connection end portion 102 disposed closer the front end than the connection pad portions 152, an optical path conversion portion 161 as a plug-side optical connection portion is formed. The optical path conversion portion 161 is provided with a later-described slope surface 162 functioning as a mirror surface and is capable of changing a direction of light transmitted from the optical waveguide to about a right angle. That is, the optical path conversion portion 161 changes an optical path extending in an axial direction of the cable 101 to an optical path extending in a direction perpendicular to the lower surface of the cable 101. Owing to this configuration, light transmitted through the optical waveguide can be emitted toward the lower side from the lower surface of the cable 101, and light incident onto the lower surface of the cable 101 from the lower side can be introduced to the optical waveguide. The optical path conversion portion 161 is formed at a position corresponding to the optical semiconductor device 72 received in the optical connection portion 16 of the connector housing 11 in a state where the cable 101 is connected to the receptacle connector 1.

The plug housing 130 includes a plug housing body 121 configured as a rectangular frame-like member extending in an axial direction of the cable 101, and a plug top plate 126 configured as a rectangular plate-like member extending in the axial direction of the cable 101 as shown in FIG. 1. The plug housing body 121 is a member integrally formed with the top plate 126 of an insulating material such as synthetic resin and is provided with a pair of sidewall portions 124 extending in the long-axis direction, front crossbar portion configured to connect front ends of the sidewall portion 124, and a rear crossbar portion 123 configured to connect rear ends of the sidewall portions 124 with each other.

The dimension in the thickness direction of the sidewall portions 124 is identical to a dimension in the thickness direction of the connection end portion 102 of the cable 101.

Moreover, the front crossbar portion 122 is configured as a rectangular plate-like member having a rectangular sectional shape, being provided with a flat lower surface as a guided surface and the front end portion 130a.

Furthermore, a plug-side front convex portion 127a is formed on the rear end surface of the front crossbar portion 122 so as to be engaged with a cable-side front concave portion 102d which is formed on the front end surface 102b of the connection end portion 102 of the cable 101. Moreover, plug-side laterally convex portions 127b configured to protrude laterally are formed on the inner side surfaces of the left and right side wall portions 124 so as to be engaged with cable-side laterally concave portions 102c which are formed to be depressed laterally from the side surfaces 102a of the cable 101. When the cable-side front concave portion 102d and the plug-side front convex portion 127a are engaged together, and the cable-side laterally concave portions 102c and the plug-side laterally convex portions 127b are engaged together, the positioning of the cable 101 relative to the plug housing 130 is achieved.

As illustrated in FIGS. 3 and 4, the plug-side front convex portion 127a and the plug-side laterally convex portions 127b function as plug-side guide portions and are configured as convex portions having a sector-like plan view shape and a circular columnar side view shape, namely circular arc-shaped side faces. Moreover, the cable-side front concave portion 102d and the cable-side laterally concave portions 102c function as cable-side guide portions and are configured as concave portions having a sector-like plan view shape and a cylindrical inner side face shape, namely circular arc-shaped side faces.

Although any one of the plug-side guide portion and the cable-side guide portion may be configured as a convex portion as long as either one of them is configured as a convex portion and the other guide portion is configured as a concave portion, in the present embodiment the description will be made as to a case where the plug-side guide portion is configured as a convex portion and the cable-side guide portion is configured as a concave portion. The case where the plug-side guide portion is configured as a concave portion and the cable-side guide portion is configured as a convex portion will be described in another embodiment. The convex portion and the concave portion may be provided in any number as long as they are provided in plural numbers and at least two of them are formed on each of the side surfaces 102a of the connection end portion 102 of the cable 101 and on each of the side surfaces of the side wall portions 124 of the connector housing 11. For example, they may be four or more, and in the present embodiment, the case will be described where the respective numbers of the convex portions and the concave portions are three, respectively.

The radius of a side surface of the plug-side front convex portion 127a and the radius of a side surface of the cable-side front concave portion 102d are approximately the same, and the radius of a side surface of each of the plug-side laterally convex portions 127b and the radius of a side surface of each of the cable-side laterally concave portions 102c are approximately the same.

In a state where the cable-side front concave portion 102d and the plug-side front convex portion 127a are engaged together, and the cable-side laterally concave portions 102c and the plug-side laterally convex portions 127b are engaged together, the cable-side front concave portion 102d and the plug-side front convex portion 127a are in a press-fitted relationship, and the cable-side laterally concave portions 102c and the plug-side laterally convex portions 127b are in a press-fitted relationship. That is to say, the plug-side front convex portion 127a is in a state of being press-fitted into the cable-side front concave portion 102d, and the plug-side laterally convex portions 127b are in a state of being press-fitted into the cable-side laterally concave portions 102c. Due to such a configuration, the positioning of the cable 101 relative to the plug housing 130 can be achieved with high precision, and the plug housing 130 and the cable 101 can be firmly connected together.

In the examples illustrated in FIGS. 3 and 4, a gap is defined between the inner side surfaces of the side wall portions 124 and the side surfaces 102a of the cable 101, and a gap is defined between the rear end surface of the front crossbar portion 122 and the front end surface 102b of the cable 101. That is to say, in the present embodiment, as long as the cable-side front concave portion 102d and the plug-side front convex portion 127a are engaged together, and the cable-side laterally concave portions 102c and the plug-side laterally convex portions 127b are engaged together, even when the remaining portions of the plug housing 130 and the cable 101 are not engaged with each other, the positioning of the cable 101 relative to the plug housing 130 can be achieved with high precision, and the plug housing 130 and the cable 101 can be firmly connected together.

Therefore, when the cable-side front concave portion 102d, the plug-side front convex portion 127a, the cable-side laterally concave portions 102c, and the plug-side laterally convex portions 127b are processed with high dimensional precision, the positioning of the cable 101 relative to the plug housing 130 can be achieved with high precision, and the plug housing 130 and the cable 101 can be firmly connected together. Accordingly, it is not necessary to increase the dimensional precision of the remaining portions of the plug housing 130 and the cable 101. As a result, the plug housing 130 and the cable 101 can be produced at low cost and in an easy manner.

Moreover, since only the cable-side front concave portion 102d, the plug-side front convex portion 127a, the cable-side laterally concave portions 102c, and the plug-side laterally convex portions 127b are in the press-fit relationship, it is possible to prevent the stress associated with the press-fit from being transmitted to the remaining portions of the plug housing 130 and the cable 101. That is to say, it is possible to suppress the influence of the stress caused by the press-fit on the entire structures of the plug housing 130 and the cable 101. Therefore, there will be substantially no optical loss in the optical waveguide.

The concave guide portions 131 of the plug housing 130 are formed at the same positions as the plug-side laterally convex portions 127b in the axial direction of the plug 120. In the examples illustrated in FIGS. 3 and 4, the central position of the concave guide portions 131 and the central position of the plug-side laterally convex portions 127b are identical to each other in the axial direction of the plug 120. Moreover, in the examples illustrated in FIGS. 3 and 4, the outline of each of the side walls 131a of the concave guide portions 131 and the outline of each of the side surfaces of the plug-side laterally convex portions 127b are formed to be concentric circles. Due to such a configuration, the positioning of the cable 101 relative to the plug housing 130 and the positioning of the plug 120 relative to the receptacle connector 1 are achieved at the same position in the axial direction of the plug 120. Therefore, it is possible to reduce cumulative errors which result from various errors, such as, for example, the dimensional errors and the assembly errors of respective members such as the cable 101, the plug housing 130, or the connector housing 11. As a result, it is possible to improve the precision of the operation of positioning the optical waveguide relative to the connector housing 11.

Moreover, the concave guide portions 131 and the plug-side laterally convex portions 127b are preferably positioned at the same position as the optical path conversion portion 161 in the axial direction of the plug 120. More specifically, as illustrated in FIGS. 3 and 4, the central position of the concave guide portions 131 and the central position of the plug-side laterally convex portions 127b are preferably identical to the position of the optical path conversion portion 161. As will be described later, the optical path conversion portion 161 is a portion which is positioned right above an optical semiconductor device 72 accommodated in the optical connection portion 16 of the receptacle connector 1 and which receives and emits light to/from the optical semiconductor device 72. Therefore, by making the central position of the concave guide portions 131 that are engaged with the convex guide portions 31 to achieve the positioning of the plug 120 relative to the receptacle connector 1 and the central position of the plug-side laterally convex portions 127b that are engaged with the cable-side laterally concave portions 102c to achieve the positioning of the cable 101 relative to the plug housing 130 identical with the position of the optical path conversion portion 161, it is possible to match surely the optical position of the receptacle connector 1, namely the position of the optical semiconductor device 72, and the optical position of the cable 101, namely the position of the optical path conversion portion 161 when the plug 120 is mounted on the receptacle connector 1.

Furthermore, even when caused by the dimensional errors of the respective members, a looseness occurs in the engagement between the convex guide portions 31 and the concave guide portions 131 or in the engagement between the cable-side laterally concave portions 102c and the plug-side laterally convex portions 127b, it is possible to suppress the mismatch of the optical position caused by the looseness to a degree where there is no problem in practical use. If the positions of the concave guide portions 131 or the positions of the plug-side laterally convex portions 127b are located distantly from the position of the optical path conversion portion 161, the distance of the optical position from the position where the looseness occurs will increase when the described looseness occurred, and thus, the mismatch of the optical position caused by the looseness will increase.

As described above, by making the positions of the concave guide portions 131 and the plug-side laterally convex portions 127b identical to the position of the optical path conversion portion 161, it is possible to reduce the influence, on the matching of the optical positions, of the cumulative errors which result from various errors, such as, for example, the dimensional errors and the assembly errors of the respective members and thus to match the optical positions with high precision.

The rear crossbar portion 123 is a rectangular plate-like member having a rectangular sectional shape and is provided with a flat upper surface, being configured such that an upper surface thereof is brought into tight contact with the lower surface of the connection end portion 102 of the cable 101, so that the cable 101 is supported from the lower side. The rear crossbar portion 123 is connected to the sidewall portions 124 so that the upper surface thereof is at the same surface as the lower surface of the sidewall portions 124. Therefore, the rear end surface of the plug housing body 121 has an approximately U shape as viewed from a rear side thereof.

In addition, the length of the plug top plate 126, that is, a dimension thereof in the long-axis direction, is substantially the same as a dimension from the front end portion 130a of the plug housing 130 to the front end surface of the rear crossbar portion 123. Moreover, the width of the plug top plate 126, that is, a dimension thereof in the short-axis direction, is substantially the same as a dimension of the plug housing body 121 as measured from an inner surface of one of the sidewall portions 124 to an inner surface of the other of the sidewall portions 124.

In the present embodiment, the cable 101 has an optical waveguide and conductive wires 151 laminated on the optical waveguide. The optical waveguide is provided with a core portion 111 serving as a light transmission path which extends in the axial direction of the cable 101 to transmit light therethrough and a plate-shaped clad portion which is configured to surround the core portion 111. In the example illustrated in the drawing figure, although the number of core portions 111 is two, the number may be one or may be three or more and may be set arbitrarily.

Moreover, although a transmission mode of the optical waveguide may be any one of a single mode and a multi mode, in this example, it will be described as being a single mode. Furthermore, a refractive index of the clad portion is preferably set to a value lower than a refractive index of the core portion 111. Furthermore, the core portion 111 and the clad portion may be formed of any kinds of materials as long as they can satisfy the above-mentioned refractive index requirements. For example, the core portion 111 and the clad portion may be formed of a silicon board, a glass board, or a flexible resin film. In this specification, a description of an example where the core portion 111 and the clad portion are formed of a flexible resin film will be provided.

The conductive wires 151 are conductive wires of a flexible circuit board, which is called FPC, for example, and are arranged on the lower surface (the upper surface in FIG. 2) of the optical waveguide in parallel with one another at a predetermined pitch so as to extend in the axial direction of the cable 101. Moreover, a first insulating layer 141 is arranged so as to cover the lower surface of the conductive wires 151. Furthermore, the first insulating layer 141 is removed in the connection end portion 102 so that a corresponding portion of the conductive wires 151 is exposed.

As described above, since the plug 120 is formed by having the plug housing 130 attached to the connection end portion 102 of the cable 101, the connection end portion 102 of the cable 101, which had flexibility and hence was difficult to handle, is made solid because of the plug housing 130 and hence becomes easy to handle. Therefore, it is possible to establish connection of the cable 101 to the receptacle connector 1 in an easy and accurate manner.

If necessary, the central position of the concave guide portions 131 and the central position of the plug-side laterally convex portions 127b in the axial direction of the plug 120 may be different from the position of the optical path conversion portion 161. For example, the concave guide portions 131 and the plug-side laterally convex portions 127b may be formed at a further front side rather than the optical path conversion portion 161. By doing so, the stress caused by the press-fit will not be transmitted to the optical path conversion portion 161 and the core portions 111 located at a further rear side rather than the optical path conversion portion 161, and accordingly, will not affect the light transmitted through the optical waveguide. Moreover, the presence of the concave guide portions 131 and the plug-side laterally convex portions 127*b* will not affect the arrangement of the conductive wires 151 or the connection pad portions 152.

Figure 5:
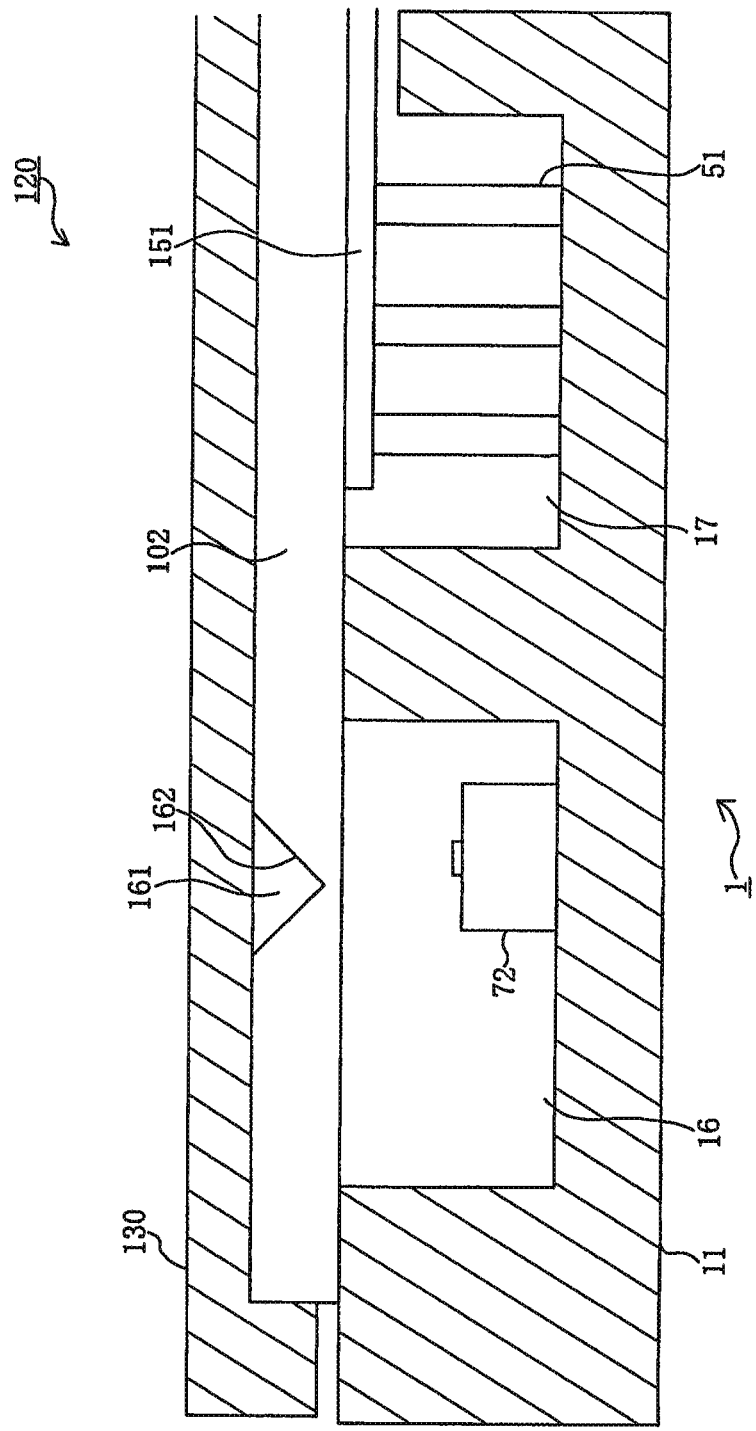
FIG. 5 is a schematic side sectional view illustrating the connection relationship between the connection end portion of a cable and an optical connection portion and an electrical connection portion of a receptacle connector according to the first embodiment of the Present Application.

Next, a description of the connection relationship between a connection end portion 102 of the cable 101 and an optical connection portion 16 and an electric connection portion 17 of a receptacle connector 1 will be provided in detail. Since the front end portion 130*a* of the plug housing 130 is engaged with the rear end portion 18*a* of the abutting portion 18 of the connector housing 11, and the concave guide portions 131 of the plug housing 130 are engaged with the convex guide portions 31 of the connector housing 11 in a state where the plug 120 is connected to the receptacle connector 1, the position of the plug 120 relative to the connector housing 11 is fixed with respect to the axial direction and the width direction of the cable 101. Therefore, as will be understood from FIG. 5, in a state where the plug 120 is connected to the receptacle connector 1, the optical path conversion portion 161 of the plug 120 is disposed at a position right above the optical semiconductor device 72 received in the optical connection portion 16 of the receptacle connector 1. Moreover, with respect to the width direction of the cable 101, the optical path conversion portion 161 of the plug 120 is disposed at a position right above the optical semiconductor device 72. Owing to this configuration, the cable 101 and the receptacle connector 1 are optically connected with each other.

That is, light emitted from a light emitting surface of the optical semiconductor device 72 is incident onto the cable 101 from the lower side thereof, reflected from the slope surface 162 disposed close to the rear side of the optical path conversion portion 161, introduced to the core portion 111 corresponding to the light emitting element 72*b* while changing a traveling direction thereof to about a right angle, and transmitted through the core portion 111 along the axial direction of the cable 101. On the other hand, light transmitted through the core portion 111 along the axial direction of the cable 101 is reflected from the slope surface 162 disposed close to the rear side of the optical path conversion portion 161, emitted toward the lower side from the lower surface of the cable 101 while changing a traveling direction thereof to about a right angle, and received by a light receiving surface of the optical semiconductor device 72.

In addition, the plug-side electric connection portion 153 of the plug 120 is disposed at a position right above the electric connection portion 17 of the receptacle connector 1, and the respective connection pad portions 152 are brought into electrical contact with the contact portions of corresponding ones of the electric connection terminals 51 received in the electric connection portion 17.

Figure 6:
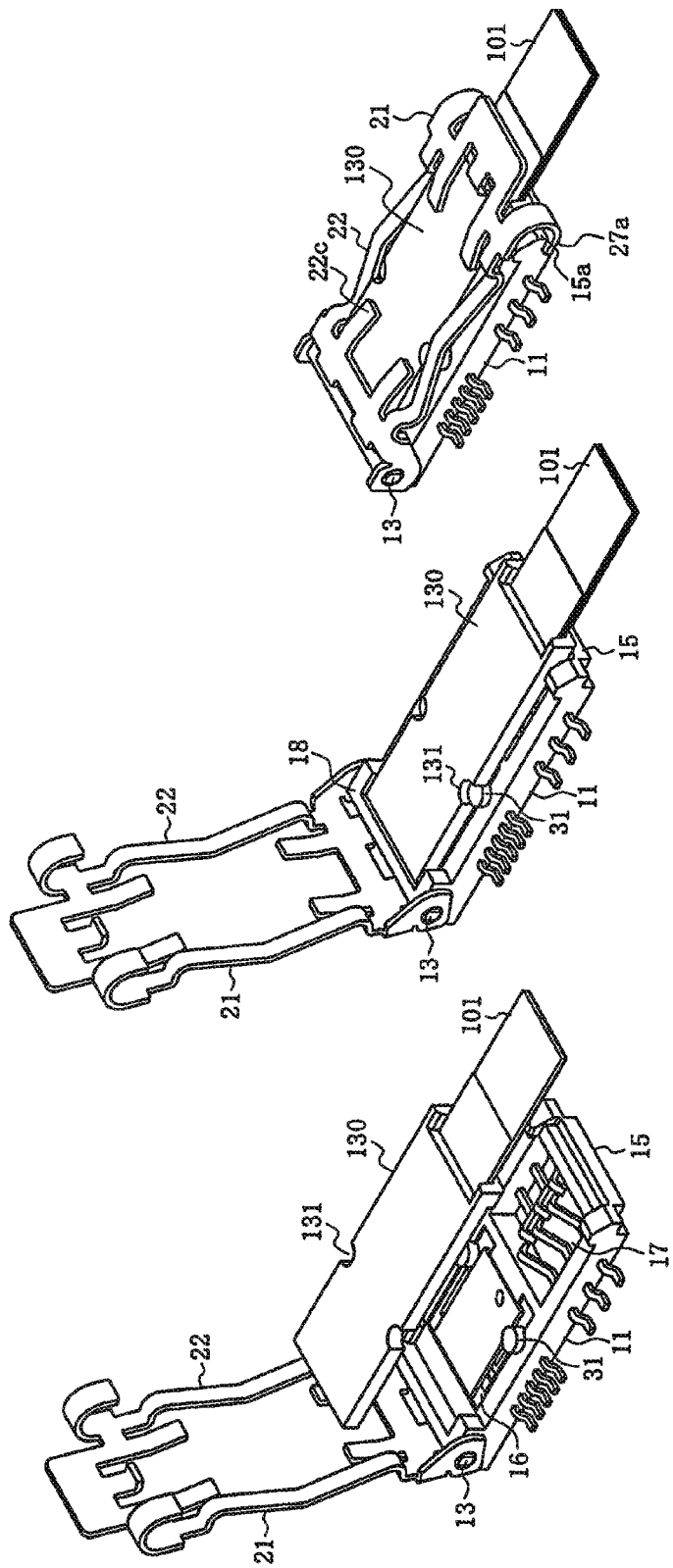

First, as illustrated in FIG. 6A, the lock member 21 of the receptacle connector 1 is moved to the open position so that the plug 120 is positioned above the connector housing 11. In this case, the lower surface of the plug 120, that is, the exposed surface of the connection pad portions 152 is positioned so as to oppose the upper surface of the connector housing 11. At the same time, the front crossbar portion 122 of the plug 120 is positioned right above the guide portion 14 of the connector housing 11, and the rear crossbar portion 123 of the plug 120 is positioned at a rear upper side of the rear-end wall portion 15 of the connector housing 11.

Subsequently, the plug 120 is lowered relative to the connector housing 11 so as to be engaged, by fitting, with the connector housing 11. In this case, the plug 120 is lowered in such a state that the front end portion 130*a* of the plug housing 130 is positioned at a slightly rear side rather than the rear end portions 18*a* of the abutting portions 18 of the connector housing 11 and that the concave guide portions 131 oppose the corresponding convex guide portions 31. Moreover, when the plug 120 is mounted on the connector housing 11, the convex guide portions 31 are inserted into the corresponding concave guide portions 131. With this operation, the concave guide portions 131 are engaged, by fitting, with the convex guide portions 31, and hence, as illustrated in FIG. 6B, the plug 120 is positioned relative to the connector housing 11.

Subsequently, the position of the lock member 21 is changed from the open position: specifically, the lock member 21 is rotated in the clockwise direction in the drawing figures about the rotation shaft 13, so that the lock member 21 reaches a position above the plug 120. When the lock member 21 is further rotated from this state, the distal end portions 27*a* of the latching arm parts 27 of the lock member 21 are brought into tight contact with the upper surfaces; that is, the tapered surfaces 15*b* of the lock projections 15*a* of the connector housing 11.

When the lock member 21 is further rotated by an operator's fingers or the like so that the latching arm parts 27 are moved downwardly, the distal end portions 27*a* are slid along the tapered surfaces 15*b*, and thus, the latching arm parts 27 are displaced in a direction away from the rotation shaft 13. Then, the bent portion 22*a* is elastically deformed and hence the flexible portion 22 having elastic properties is expanded. When the distal end portions 27*a* of the latching arm parts 27 of the lock member 21 are brought into tight contact with the apex portions of the lock projections 15*a* of the connector housing 11, the flexible portion 22 is in its most expanded state.

Moreover, when the lock member 21 is further rotated from the above-described state so that the latching arm parts 27 are further moved downwardly, the distal end portions 27*a* are separated from the apex portions of the lock projections 15*a* to be inserted into the concave latching portions 15*c* on the lower surface side of the lock projections 15*a*. Moreover, the bent portion 22*a* restores its original shape by a spring's restoring force so that the flexible portion 22 is contracted to restore its original shape. Furthermore, the distal end portions 27*a* are engaged with the lower surfaces of the lock projections 15*a*. In this way, the lock member 21 is latched to the connector housing 11 at the closed position as illustrated in FIG. 6C so that the plug 120 is locked.

In this manner, the plug 120 is locked by being tightly fitted with the receptacle connector 1, and thus, the cable 101 is firmly connected to the receptacle connector 1.

Furthermore, when the position of the plug 120 relative to the connector housing 11 is fixed, the optical path conversion portion 161, as the plug-side optical connection portion, and the plug-side electric connection portion 153 of the plug 120 are positioned so as to oppose the optical connection portion 16 and the electric connection portion 17 of the connector housing 11, respectively. Moreover, the position in the thickness direction of the plug 120 is determined when the lower surface of the front crossbar portion 122 is brought into tight contact with the upper surface of the guide portion 14. In addition, the front end portion 130*a* of the plug housing 130 is engaged with the rear end portion 18*a* of the abutting portion 18 of the connector housing 11. Furthermore, the rear crossbar portion 123 in the vicinity of the rear end of the plug 120 is engaged with the rear end wall portion 15 of the connector housing 11. Therefore, the positional relationship between the plug 120 and the connector housing 11 can be stably maintained. Owing to these configurations, the positional relationship is not disturbed even upon receipt of an unexpected external force.

As illustrated in FIG. 6C, it is necessary to unlock the plug 120 in order to remove the plug 120 from engagement with the receptacle connector 1. In this case, the operator downwardly presses the bent portions 22a of the flexible portions 22 with the operator's fingers or the like. In this way, the bent portions 22a are elastically deformed, and the flexible portions 22 are expanded. As a result, the distal end portions 27a of the latching arm parts 27 are displaced in the direction away from the rotation shaft 13, and the distal end portions 27a are disengaged from the lower surfaces of the lock projections 15a. That is, the latched state between the distal end portions 27a of the latching arm parts 27 and the concave latching portions 15c is released.

In such a state, when the operator moves the operation portion 25b toward the upper side by the operator's fingers or the like, the lock member 21 is rotated in the counter-clockwise direction about the rotation shaft 13, so that the latching arm parts 27 are moved upward. With this operation, the plug 120 is unlocked.

As described above, the optical connector according to the present embodiment includes the cable 101 having formed therein the optical waveguide, the plug 120 having the cable 101 connected thereto, and the connector housing 11 configured to mount the plug 120 thereon. The cable 101 is provided with the cable-side guide portions. The plug 120 is provided with the plug housing 130 which has the plug-side guide portion and is attached to the cable 101. Either one of the cable-side guide portion and the plug-side guide portion is configured as a protrusive convex portion, and the other guide portion is configured as a concave portion so that the convex portion is press-fitted into the concave portion, thereby achieving the positioning of the cable 101 and the plug housing 130. Specifically, the cable-side guide portion is configured as the cable-side front concave portion 102d and the cable-side laterally concave portions 102c, which are used as the concave portion, and the plug-side guide portion is configured as the plug-side front convex portion 127a and the plug-side laterally convex portions 127b, which are used as the convex portion.

Due to such a configuration, when the cable-side front concave portion 102d, the plug-side front convex portion 127a, the cable-side laterally concave portions 102c, and the plug-side laterally convex portions 127b are processed with high dimensional precision, the positioning of the cable 101 relative to the plug housing 130 can be achieved with high precision, and the plug housing 130 and the cable 101 can be firmly connected together. Accordingly, it is not necessary to increase the dimensional precision of the remaining portions of the plug housing 130 and the cable 101. Moreover, the positioning of the optical waveguide and the plug housing 130 can be achieved in an accurate and easy manner. In addition, since only the cable-side front concave portion 102d, the plug-side front convex portion 127a, the cable-side laterally concave portions 102c, and the plug-side laterally convex portions 127b are in the press-fit relationship, it is possible to suppress the influence of the stress caused by the press-fit on the entire structures of the plug housing 130 and the cable 101. Therefore, there will be substantially no optical loss in the optical waveguide. Therefore, it is possible to reduce the size of the optical connector assembly, increase the durability thereof, simplify the structure thereof, decrease the production cost, and facilitate the operability thereof.

Moreover, the cable 101 is provided with the optical path conversion portion 161 which is configured to be capable of reflecting light transmitted through the optical waveguide to be emitted to the outside of the cable 101 and reflecting light incident from the outside of the cable 101 to be introduced to the optical waveguide. Two of the convex portions and two of the concave portions, namely the plug-side laterally convex portions 127b and the cable-side laterally concave portions 102c, are positioned at the same positions as the optical path conversion portion 161 in the axial direction of the plug 120. Due to such a configuration, it is possible to reduce the influence on the matching of the optical positions due to cumulative errors which result from various errors, such as, for example, the dimensional errors and the assembly errors of the respective members and thus to match the optical positions with high precision.

Furthermore, the connector housing 130 is provided with the connector-side guide portion, the plug 120 is provided with the relative connector guide portion configured to be engaged with the connector-side guide portion, and the relative connector guide portion is positioned at the same position as the optical path conversion portion 161 in the axial direction of the plug 120. Specifically, the connector-side guide portion is configured as the convex guide portions 31, and the relative connector guide portion is configured as the concave guide portions 131. Due to such a configuration, it is possible to reduce cumulative errors which result from various errors, such as, for example, the dimensional errors and the assembly errors of respective members such as the cable 101, the plug housing 130, or the connector housing 11. As a result, it is possible to improve the precision of the operation of positioning the optical waveguide relative to the connector housing 11.

Furthermore, the cable 101 is the hybrid cable having laminated therein the optical waveguide and the conductive wires 151. The plug 120 is provided with the optical path conversion portion 161 and the plug-side electrical connection portion 153. The connector housing 11 is provided with the optical connection portion 16 and the electrical connection portion 17. When the plug 120 is mounted on the connector housing 11, the optical path conversion portion 161 and the plug-side electrical connection portion 153 oppose the optical connection portion 16 and the electrical connection portion 17. Due to such a configuration, the plug 120 can be reduced in its entire size, and it is thus possible to perform a wiring operation of the cable 101 in an extremely simple manner. Moreover, the plug 120 can be engaged surely, and thus it is possible to attain a secure optical and electrical connection with the cable 101. Furthermore, since the cable 101 is integrally formed by laminating therein the optical waveguide and the conductive wires 151, it is not necessary to wire the optical waveguide and the conductive wires 151 in an individual manner, and thus the wiring operation is made easy.

In the present embodiment, the radius of each of the circular arc-shaped side faces of the cable-side front concave portion 102d and the radius of each of the circular arc-shaped side faces of the cable-side laterally concave portions 102c are set so as to be smaller than that of the first embodiment. On the other hand, the radius of each of the circular arc-shaped side faces of the plug-side front convex portion 127a, the radius of each of the circular arc-shaped side faces of the plug-side laterally convex portions 127b, and the radius of each of the side walls 131a of the concave guide portions 131 are set so as to be equal to that of the first embodiment. For this reason, the radius of a side surface of the cable-side front concave portion 102d is smaller than the radius of a side surface of the plug-side front convex portion 127a, and the radius of a side surface of each of the cable-side laterally concave portions 102c is smaller than the radius of a side surface of each of the plug-side laterally convex portions 127b.

Figure 7:
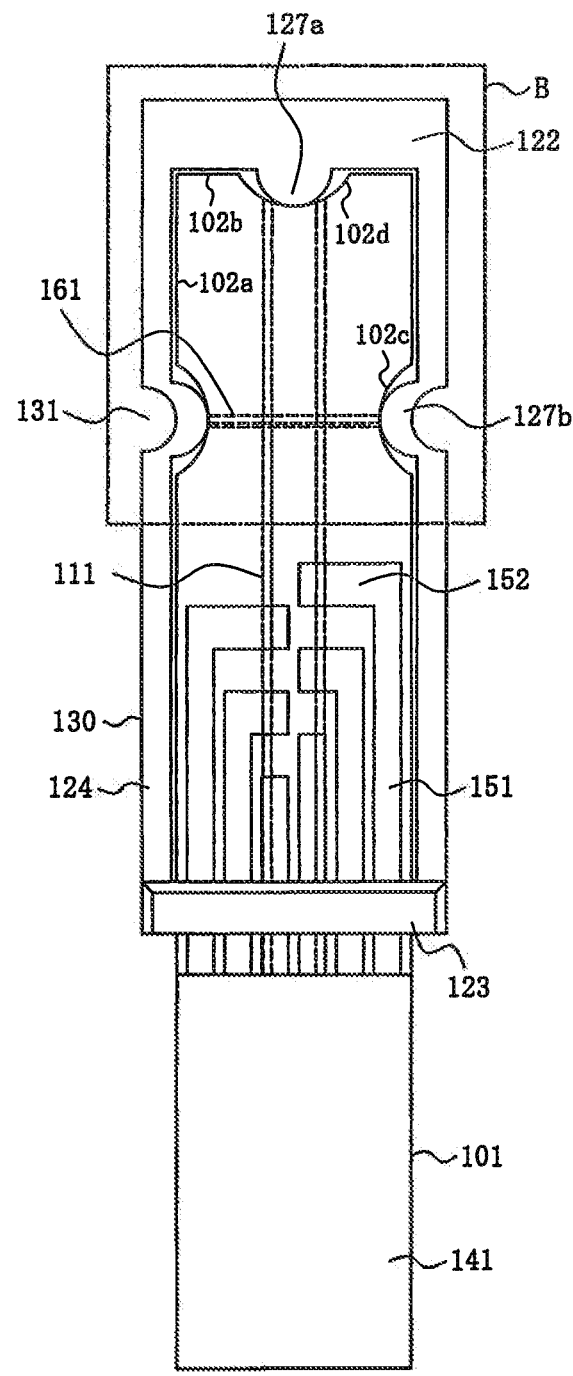
FIG. 7 is a bottom plan view of a plug according to a second embodiment of the Present Application.
Figure 8:
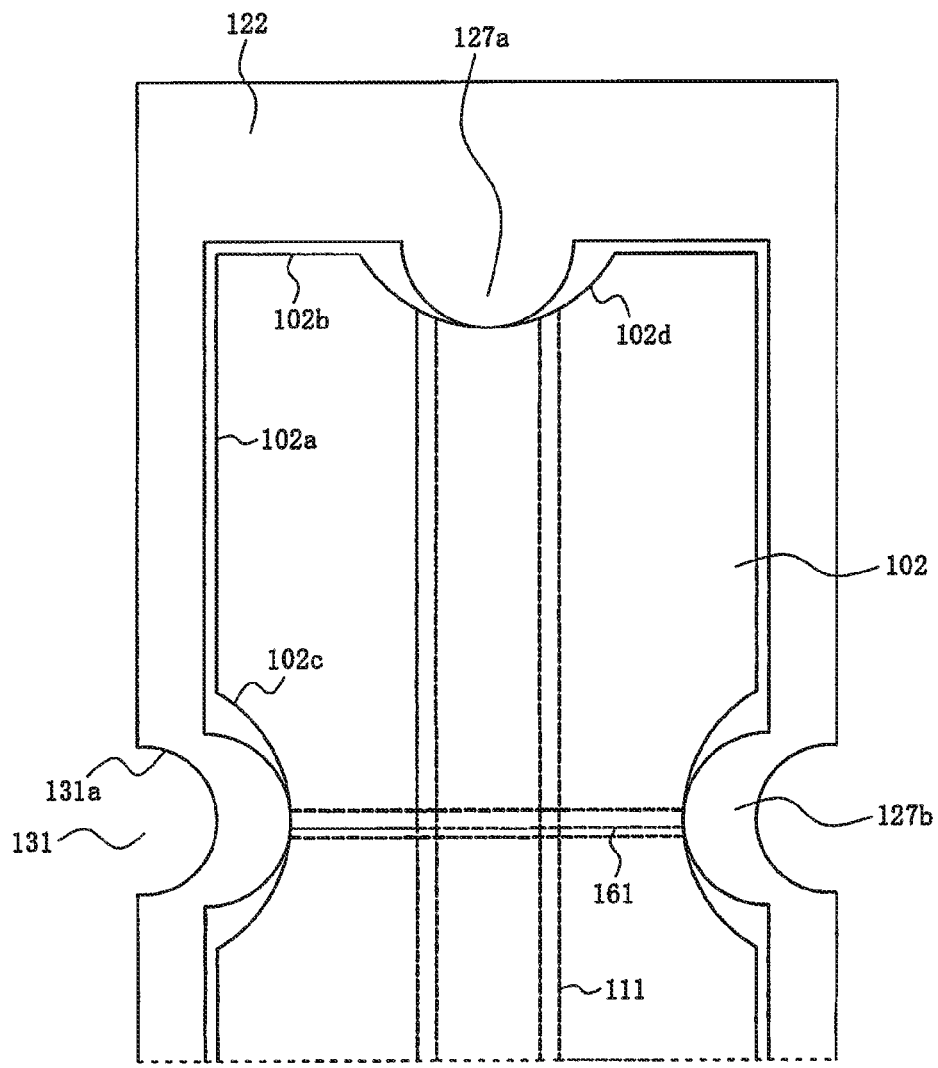
FIG. 8 is an enlarged view of a main portion ("B" portion in FIG. 7) of the plug according to the second embodiment of the Present Application.

Therefore, as illustrated in FIGS. 7 and 8, in a state where the plug-side front convex portion 127a is press-fitted into the cable-side front concave portion 102d, and the plug-side laterally convex portions 127b is press-fitted into the cable-side laterally concave portions 102c, the size of an area where the side surface of the plug-side front convex portion 127a makes pressing-contact with the side surface of the cable-side front concave portion 102d, namely the interfering portion of the plug-side front convex portion 127a and the cable-side front concave portion 102d, and the size of an area where the side surface of each of the plug-side laterally convex portions 127b makes pressing-contact with the side surface of each of the cable-side laterally concave portions 102c, namely the interfering portion of the plug-side laterally convex portions 127b and the cable-side laterally concave portions 102c are smaller than that of the first embodiment.

As described above, since the size of the interfering portion of the plug-side front convex portion 127a and the cable-side front concave portion 102d and the size of the interfering portion of the plug-side laterally convex portions 127b and the cable-side laterally concave portions 102c are small, it is possible to more effectively suppress the stress caused by the press-fit from being transmitted to the remaining portions of the plug housing 130 and the cable 101. That is to say, it is possible to more effectively suppress the influence of the stress caused by the press-fit. Therefore, there will be substantially no optical loss in the optical waveguide.

Other structures, operations and effects are the same as those of the first embodiment, and redundant description thereof will be omitted.

In the present embodiment, the side surface of the cable-side front concave portion 102d and the side surface of each of the cable-side laterally concave portions 102c are provided with two oblique sides being inclined in mutually opposite directions with respect to the central line. In the examples illustrated in FIGS. 9 and 10, the cable-side front concave portion 102d has a triangular shape or generally a V shape that includes two oblique sides being inclined in mutually opposite directions and is open to the front end surface 102b of the cable 102. The cable-side laterally concave portions 102c have a triangular shape or generally a V shape that includes two oblique sides being inclined in mutually opposite directions and is open to the side surfaces 102a of the cable 102. However, the cable-side front concave portion 102d and the cable-side laterally concave portions 102c may have any shape.

That is to say, the top view shape of the cable-side front concave portion 102d is not necessarily the triangular shape or generally the V shape, but may be a trapezoidal shape, for example, and may be any shape as long as it has such a shape that it is open to the front end surface 102b, at least a portion of the front end surface 102b exists on both sides thereof, it includes two oblique sides being inclined in mutually opposite sides with respect to the central line of the cable-side front concave portion 102d, and it allows insertion of at least a portion of the plug-side front convex portion 127a. Similarly, the top view shape of the cable-side laterally concave portions 102c is not necessarily the triangular shape or generally the V shape, but may be a trapezoidal shape, for example, and may be any shape as long as it has such a shape that it is open to the side surfaces 102a, at least a portion of the side surfaces 102a exists on both sides thereof, it includes two oblique sides being inclined in mutually opposite sides with respect to the central line of the cable-side laterally concave portions 102c, and it allows insertion of at least a portion of the plug-side laterally convex portions 127b.

Figure 9:
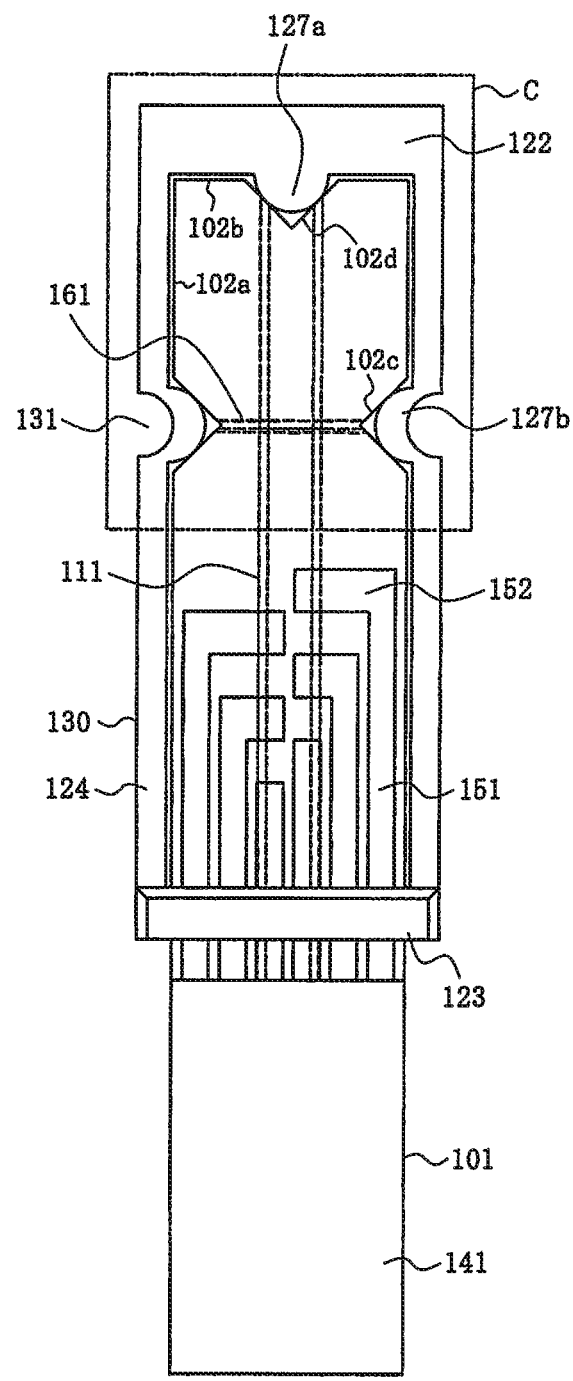
FIG. 9 is a bottom plan view of a plug according to a third embodiment of the Present Application.
Figure 10:
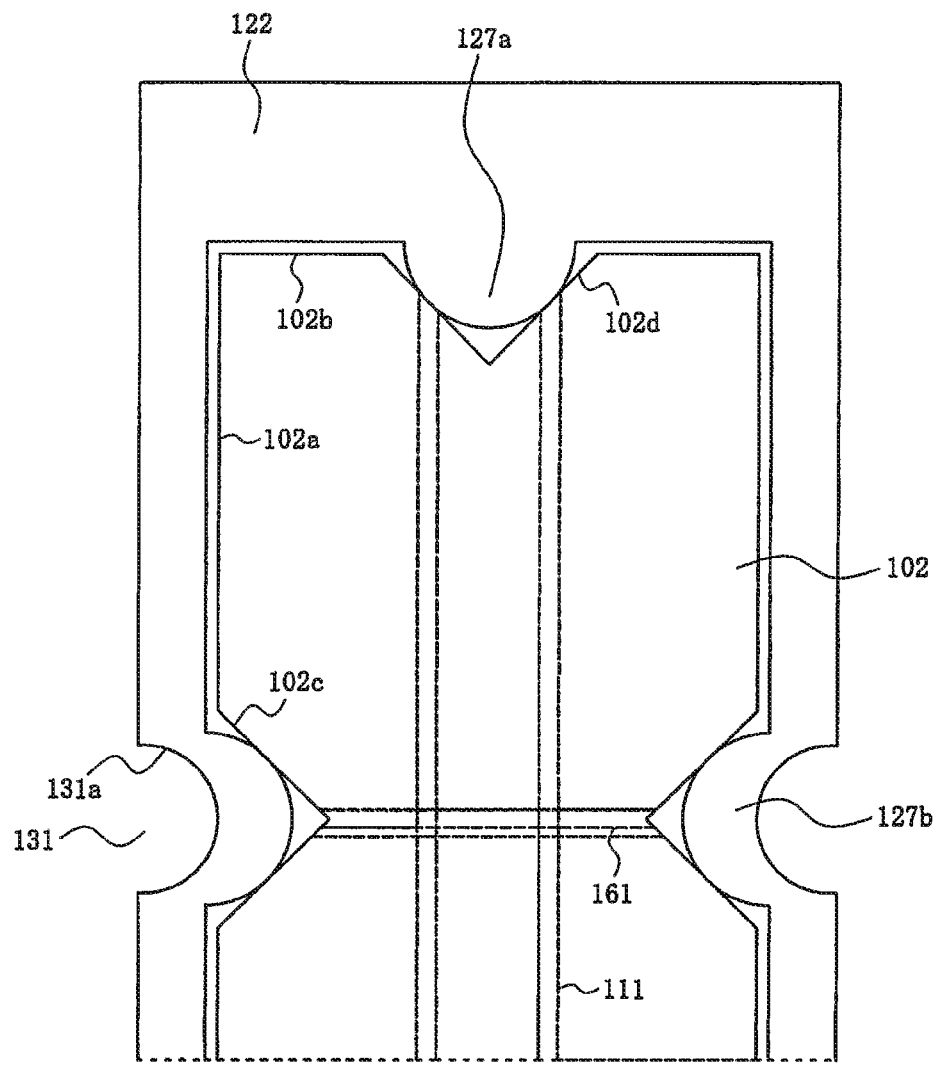
FIG. 10 is an enlarged view of a main portion ("C" portion in FIG. 9) of the plug according to the third embodiment of the Present Application.

Therefore, as illustrated in FIGS. 9 and 10, in a state where the plug-side front convex portion 127a is press-fitted into the cable-side front concave portion 102d, and the plug-side laterally convex portions 127b is press-fitted into the cable-side laterally concave portions 102c, the size of an area where the side surface of the plug-side front convex portion 127a makes pressing-contact with the side surface of the cable-side front concave portion 102d, namely the interfering portion of the plug-side front convex portion 127a and the cable-side front concave portion 102d, and the size of an area where the side surface of each of the plug-side laterally convex portions 127b makes pressing-contact with the side surface of each of the cable-side laterally concave portions 102c, namely the interfering portion of the plug-side laterally convex portions 127b and the cable-side laterally concave portions 102c are smaller than that of the first embodiment. Specifically, the interfering portion of the plug-side front convex portion 127a and the cable-side front concave portion 102d occurs at only one location in each of the two oblique sides of the cable-side front concave portion 102d. Similarly, the interfering portion of the plug-side laterally convex portions 127b and the cable-side laterally concave portions 102c occurs at only one location in each of the two oblique sides of the cable-side laterally concave portions 102c.

As described above, since the size of the interfering portion of the plug-side front convex portion 127a and the cable-side front concave portion 102d and the size of the interfering portion of the plug-side laterally convex portions 127b and the cable-side laterally concave portions 102c are small, it is possible to more effectively suppress the stress caused by the press-fit from being transmitted to the remaining portions of the plug housing 130 and the cable 101. That is to say, it is possible to more effectively suppress the influence of the stress caused by the press-fit. Therefore, there will be substantially no optical loss in the optical waveguide.

In the present embodiment, the case will be described where the plug-side guide portion is configured as a concave portion, and the cable-side guide portion is configured as a convex portion.

In the present embodiment, the cable-side laterally concave portions 102c are configured as a concave portion having an approximately rectangular shape from a top plan view thereof that is open to the side surfaces 102a and depressed toward the center in the width direction of the cable 101. On the inner side surfaces in the width direction of the cable-side laterally concave portions 102c, cable-side laterally convex portions 102e having a circular arc shape from a top plan view thereof are formed so as to protrude outwardly in the width direction. Moreover, the plug-side laterally convex portions 127b are configured as a convex portion having an approximately rectangular shape from a top plan view thereof that protrudes from the inner side surface of each of the side wall portions 124 to the center in the width direction. On the inner side surfaces in the width direction of the plug-side laterally convex portions 127b, plug-side laterally concave portions 127c having a circular arc shape from a top plan view thereof are formed so as to be depressed outwardly in the width direction. The cable-side laterally convex portions 102e are configured as a convex portion used as the cable-side guide portion, and the plug-side laterally concave portions 127c are configured as a concave portion used as the plug-side guide portion. In a state where the cable-side laterally concave portions 102c and the plug-side laterally convex portions 127b are engaged together, the plug-side laterally convex portions 127b are inserted into the cable-side laterally concave portions 102c, whereby the cable-side laterally convex portions 102e are press-fitted into the plug-side laterally concave portions 127c.

Figure 11:
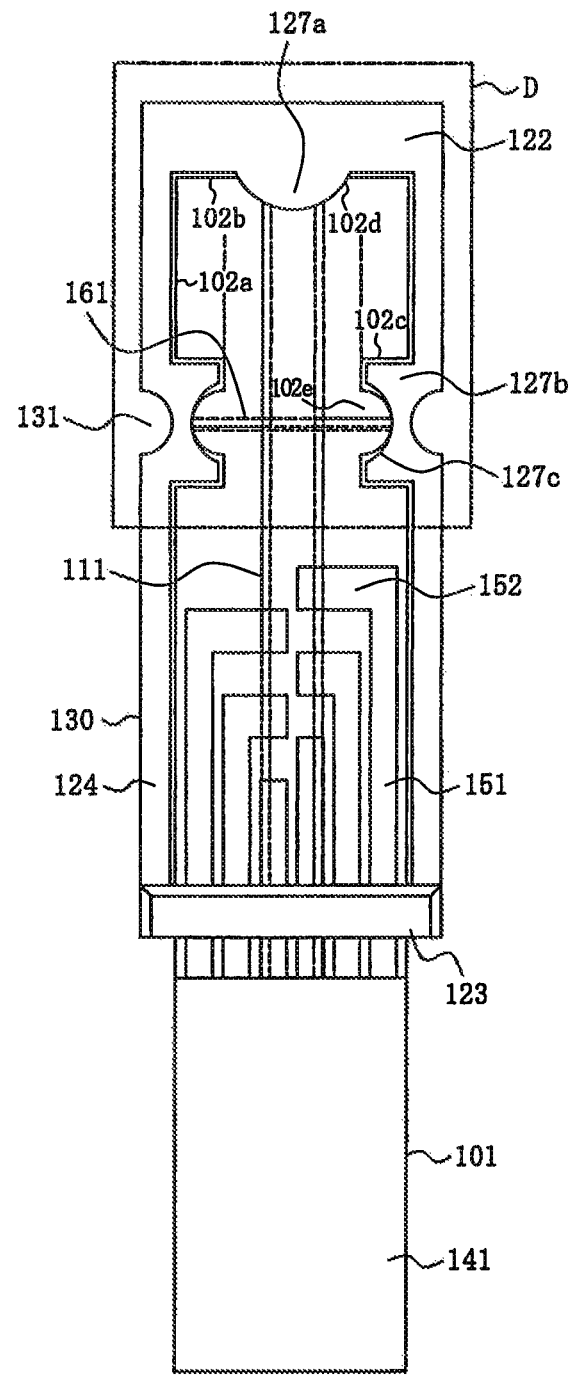
FIG. 11 is a bottom plan view of a plug according to a fourth embodiment of the Present Application.
Figure 12:
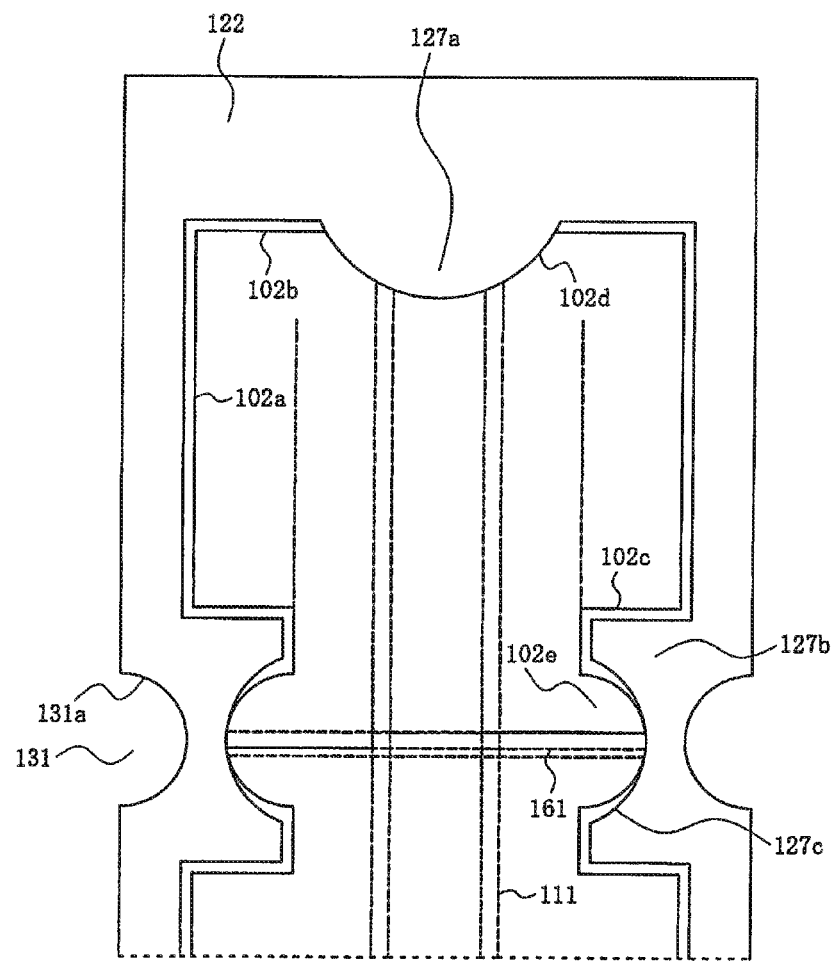
FIG. 12 is an enlarged view of a main portion ("D" portion in FIG. 11) of the plug according to the fourth embodiment of the Present Application.
Figure 13:
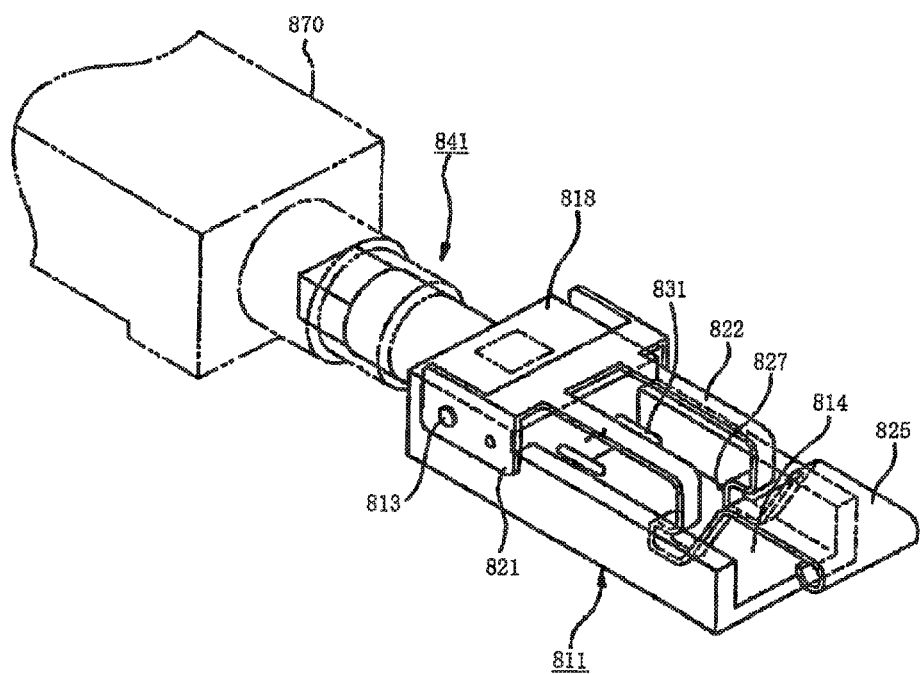
FIG. 13 is a perspective view of an optical connector according to the prior art.

Here, the radius of the side surface of each of the cable-side laterally convex portions 102e is set so as to be smaller than the radius of the side surface of each of the plug-side laterally concave portions 127c. Therefore, as illustrated in FIGS. 11 and 12, in a state where the cable-side laterally convex portions 102e are press-fitted into the plug-side laterally concave portions 127c, the size of an area where the side surface of each of the cable-side laterally convex portions 102e makes pressing-contact with the side surface of each of the plug-side laterally concave portions 127c, namely the interfering portion of the plug-side laterally concave portions 127c and the cable-side laterally convex portions 102e is small.

As described above, since the size of the interfering portion of the plug-side laterally concave portions 127c and the cable-side laterally convex portions 102e is small, it is possible to more effectively suppress the stress caused by the press-fit from being transmitted to the remaining portions of the plug housing 130 and the cable 101. That is to say, it is possible to more effectively suppress the influence of the stress caused by the press-fit. Therefore, there will be substantially no optical loss in the optical waveguide.

Other structures and operations are the same as those of the first to third embodiments, and redundant description thereof will be omitted.

While a preferred embodiment of the Present Application is shown and described, it is envisioned that those skilled in the art may devise various modifications without departing from the spirit and scope of the foregoing Description and the appended Claims.

What is claimed is:

1. An optical connector, the optical connector comprising:
   a cable having formed therein an optical waveguide, the cable including a front cable-side guide recess and at least one lateral cable-side guide portion; and
   a plug connected to the cable, the plug including a front guide protrusion, at least one side guide protrusion and at least one side guide recess, the plug being mounted on a connector housing, the connector housing including at least one connector housing guide portion, the connector housing and each connector housing guide portion being formed of an insulative material;
   wherein:
   the front guide protrusion is received within the front cable-side guide recess;
   each side guide recess is formed at the same position as a corresponding side guide protrusion;
   each connector housing guide portion is received with within one side guide recess and prevents to prevent movement of the plug in both the length and width direction;
   the plug includes a plug housing, the plug housing including a plug-side guide portion and being attached to the cable; and
   each connector housing guide portion is press fit into a plug housing guide portion of the plug housing.

2. The optical connector of claim 1, wherein one of the cable-side guide portion and the plug-side guide portion is configured as a protrusive convex portion, and the other is configured as a concave portion, the convex portion being press fit into the concave portion, thereby positioning the cable into the plug housing.

3. The optical connector of claim 2, wherein the convex portion and the concave portion are plural.

4. The optical connector of claim 3, wherein at least two of the convex portions protrude laterally from either a side surface of the cable or the plug housing.

5. The optical connector of claim 4, wherein at least two of the concave portions are depressed laterally from either the side surface of the cable or the plug housing.

6. The optical connector of claim 5, wherein each convex portion includes circular arc-shaped side faces, and each concave portion includes circular arc-shaped side faces.

7. The optical connector of claim 6, wherein a radius of each convex portion is smaller than a radius of each concave portion.

8. The optical connector of claim 7, wherein each concave portion further includes two oblique sides inclined in mutually opposite directions to a central line of each concave portion.

9. The optical connector of claim 8, wherein the cable includes an optical path conversion portion, which reflects light transmitted through the optical waveguide emitted to the outside of the cable, and light incident from the outside of the cable introduced to the optical waveguide.

10. The optical connector of claim 9, wherein two of the convex portions and two of the concave portions are positioned at the same positions as the optical path conversion portion in the axial direction of the plug.

11. The optical connector of claim 10, wherein the connector housing includes a connector-side guide portion.

12. The optical connector of claim 11, wherein the plug includes a relative connector guide portion engaged with the connector-side guide portion.

13. The optical connector of claim 12, wherein the relative connector guide portion is positioned at the same position as the optical path conversion portion in the axial direction of the plug.

14. The optical connector of claims 13, wherein the cable is a hybrid cable having laminated therein an optical waveguide and conductive wires.

15. The optical connector of claim 14, wherein the plug further includes a plug-side optical connection portion and a plug-side electrical connection portion.

16. The optical connector of claim 15, wherein the connector housing further includes an optical connection portion and an electrical connection portion.

17. The optical connector of claim 16, wherein, when the plug is mounted on the connector housing, the plug-side optical connection portion and the plug-side electrical connection portion oppose the optical connection portion and the electrical connection portion, respectively.

18. The optical connector of claim 1, wherein one of the housing guide portions is a recess, and the other is a protrusion.

* * * * *